(12) United States Patent
Troia et al.

(10) Patent No.: US 11,618,394 B2
(45) Date of Patent: Apr. 4, 2023

(54) VEHICLE SECURE MESSAGES BASED ON A VEHICLE PRIVATE KEY

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

( * ) Notice: Subject to any disclaimer, the term of this patent is extended or adjusted under 35 U.S.C. 154(b) by 176 days.

(21) Appl. No.: 16/953,490

(22) Filed: Nov. 20, 2020

(65) Prior Publication Data

US 2021/0070237 A1 Mar. 11, 2021

Related U.S. Application Data

(62) Division of application No. 15/847,073, filed on Dec. 19, 2017, now Pat. No. 10,850,684.

(51) Int. Cl.
*H04W 4/44* (2018.01)
*B60R 16/023* (2006.01)
(Continued)

(52) U.S. Cl.
CPC .............. *B60R 16/023* (2013.01); *G06F 8/65* (2013.01); *H04L 9/0861* (2013.01);
(Continued)

(58) Field of Classification Search
USPC ........ 713/150, 163, 176, 181; 726/2, 21, 36; 380/255, 264, 276
See application file for complete search history.

(56) References Cited

U.S. PATENT DOCUMENTS

| 7,899,610 | B2* | 3/2011 | McClellan | .......... B60R 16/0236 |
| | | | | 701/115 |
| 8,126,642 | B2* | 2/2012 | Trepagnier | ........... G05D 1/0214 |
| | | | | 701/28 |
| 9,331,989 | B2* | 5/2016 | Dover | .................... H04L 9/3236 |
| 9,569,622 | B2* | 2/2017 | Dover | .................... G06F 9/4406 |
| 9,613,214 | B2* | 4/2017 | Dover | .................... G06F 21/57 |
| 2004/0003231 | A1* | 1/2004 | Levenson | ........... B60R 16/0234 |
| | | | | 713/155 |

(Continued)

FOREIGN PATENT DOCUMENTS

| CN | 106168899 A | 11/2016 |
| KR | 20150074414 A | 7/2015 |
| WO | 2017147207 A1 | 8/2017 |

OTHER PUBLICATIONS

International Search Report and Written Opinion from related international application No. PCT/US2018/063810, dated Mar. 18, 2019, 16 pages.

*Primary Examiner* — Sharif E Ullah
(74) *Attorney, Agent, or Firm* — Brooks, Cameron & Huebsch, PLLC

(57) ABSTRACT

An example apparatus comprises a processing resource coupled to a memory resource. The processing resource may be configured to execute instructions stored on the memory resource to generate a first secure key including a private key stored by a vehicle, generate a first secure message including the first secure key, transmit the first secure message over a vehicle bus to a vehicle part associated with the vehicle, and receive, from the vehicle part, a second secure message including at least one of a vehicle identification number (VIN) and a configuration parameter corresponding to the vehicle part in response to a determination that the first secure key matches a secure key corresponding to the vehicle part.

16 Claims, 5 Drawing Sheets

(51) Int. Cl.
  *H04L 9/40*    (2022.01)
  *G06F 8/65*    (2018.01)
  *H04L 9/08*    (2006.01)
  *H04L 9/14*    (2006.01)
  *H04L 9/32*    (2006.01)
  *H04W 12/06*   (2021.01)
  *H04W 12/04*   (2021.01)
  *H04W 12/02*   (2009.01)

(52) U.S. Cl.
  CPC .............. *H04L 9/0894* (2013.01); *H04L 9/14* (2013.01); *H04L 9/3247* (2013.01); *H04L 63/0428* (2013.01); *H04L 63/06* (2013.01); *H04L 63/061* (2013.01); *H04L 63/08* (2013.01); *H04W 4/44* (2018.02); *H04W 12/02* (2013.01); *H04W 12/04* (2013.01); *H04W 12/06* (2013.01)

(56) References Cited

U.S. PATENT DOCUMENTS

| | | | |
|---|---|---|---|
| 2015/0180840 A1* | 6/2015 | Jung | H04L 9/3247 713/150 |
| 2016/0026787 A1* | 1/2016 | Nairn | G06F 21/64 726/17 |
| 2016/0344705 A1* | 11/2016 | Stumpf | H04L 9/3213 |
| 2017/0060559 A1* | 3/2017 | Ye | G06F 8/65 |
| 2017/0134164 A1* | 5/2017 | Haga | G06F 8/654 |
| 2017/0195459 A1* | 7/2017 | e Costa | H04L 67/025 |
| 2017/0214744 A1* | 7/2017 | Neves | H04L 67/34 |
| 2017/0244565 A1* | 8/2017 | Bronk | H04W 12/106 |
| 2017/0286675 A1* | 10/2017 | Shin | H04L 63/1416 |
| 2017/0346542 A1* | 11/2017 | Neves | H04B 7/0691 |
| 2017/0358204 A1* | 12/2017 | Modica | G08G 1/0129 |
| 2019/0101914 A1* | 4/2019 | Coleman, II | G08G 1/0104 |

* cited by examiner

VEHICLE SECURE MESSAGES BASED ON A VEHICLE PRIVATE KEY

PRIORITY INFORMATION

This application is a Divisional of U.S. application Ser. No. 15/847,073, filed on Dec. 19, 2017, which will issue as U.S. Pat. No. 10,850,684 on Dec. 1, 2020, the contents of which are incorporated herein by reference.

TECHNICAL FIELD

The present disclosure relates generally to semiconductor memory and methods, and more particularly, to apparatuses and methods related to vehicle secure messages based on a vehicle private key.

BACKGROUND

In conventional motor vehicles (e.g., automobiles, cars, trucks, buses, etc.), the driver is critical to operating the vehicle's control system. For example, the driver of a conventional motor vehicle makes decisions regarding the safe operation of the vehicle. Such decisions may include decisions related to the speed of the vehicle, steering of the vehicle, obstacle and/or hazard recognition, and obstacle and/or hazard avoidance. However, a driver's ability to make these decisions and operate the vehicle's control system may be limited in some situations. For example, driver impairment, fatigue, attentiveness, and/or other factors such as visibility (e.g., due to weather or changes in terrain) may limit a driver's ability to safely operate a conventional motor vehicle and/or its control system.

In order to alleviate the deficiencies resulting from driver operation of a conventional motor vehicle, various manufacturers have experimented with autonomous vehicles. While autonomous vehicles may allow for a reduction in issues that may arise as a result of the driver's ability to operate the conventional motor vehicle becoming lessened, autonomous vehicles have their own shortcomings.

For example, autonomous vehicles may rely on various control components (e.g., control circuits), sensors, and/or cameras to determine a speed at which to operate the vehicle, steering of the vehicle, obstacle and/or hazard recognition, and obstacle and/or hazard avoidance. Such sensors and/or cameras may fail or may require additional information to safely operate the autonomous vehicle from a host computing device responsible for providing updates to the autonomous vehicle. If the sensors and/or cameras fail or do not receive adequate information to continue to operate the autonomous vehicle, the autonomous vehicle may cease to operate or, in worse case scenarios, fail to provide adequate obstacle and/or hazard recognition, and obstacle and/or hazard avoidance, which may result in injury or death to passengers in the autonomous vehicle.

DETAILED DESCRIPTION

Figure 1:
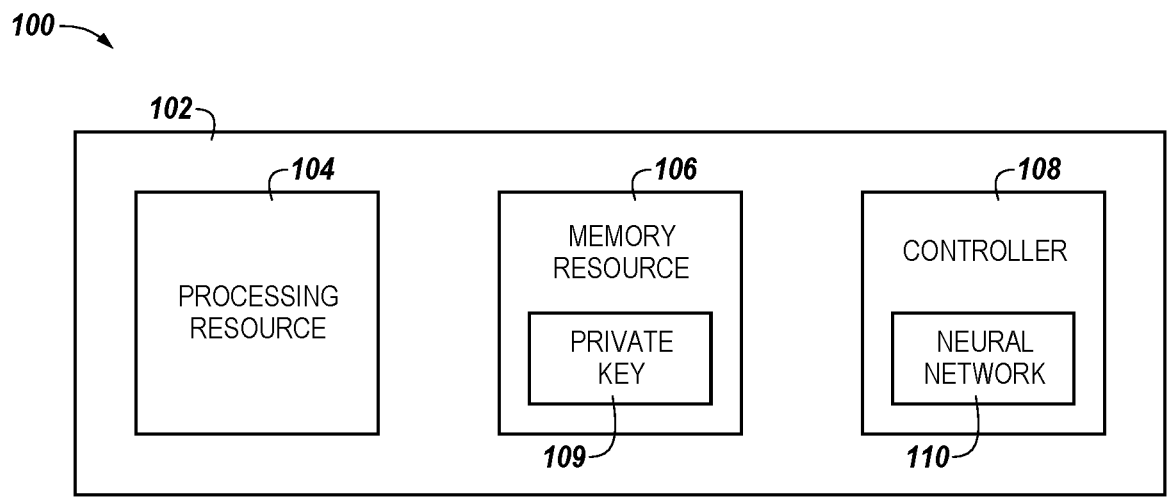
FIG. 1 is a block diagram of an apparatus in the form of a control unit in accordance with a number of embodiments of the present disclosure.

The present disclosure includes apparatuses and methods related to vehicle secure messages based on a vehicle private key. An example apparatus comprises a processing resource coupled to a memory resource. The processing resource may be configured to execute instructions stored on the memory resource to generate a first secure key including a private key stored by a vehicle, generate a first secure message including the first secure key, transmit the first secure message over a vehicle bus to a vehicle part associated with the vehicle, and receive, from the vehicle part, a second secure message including at least one of a vehicle identification number (VIN) and a configuration parameter corresponding to the vehicle part in response to a determination that the first secure key matches a secure key corresponding to the vehicle part.

In some embodiments, the secure message may include one or more authentication protocols, which may include one or more anti-replay mechanisms. An anti-replay mechanism may include information to indicate a "freshness" of the secure message (e.g., to indicate that the message was generated at or within a particular time period) and/or the additional fields may include one or more anti-replay protocols to alleviate the risk of a man-in-the-middle attack, for example. Non-limiting examples of anti-replay mechanisms may include a timestamp (e.g., a secure timestamp) that may be generated and included as part of the anti-replay mechanism, a cryptographic nonce, which may be a random or pseudo-random value that is generated for one time use and included as part of the anti-replay protocol, and/or a count value that may be included as part of the anti-replay mechanism. In some embodiments, the count value may be a numerical value associated with a counter that is monotonically incremented based on various criteria such as the vehicle being powered on, a vehicle part being installed in the vehicle, etc.

A vehicle may be under the control of the vehicle manufacturer during production. The vehicle manufacturer may provide an initial configuration of the vehicle and/or vehicle components during or directly after production, but prior to the vehicle reaching an end user. However, after the vehicle is no longer under the control of the manufacturer (e.g., once the vehicle has been shipped, purchased, etc.) the manufacturer may no longer have any control over the configuration of the vehicle. In addition, a vehicle part manufacturer (e.g., a manufacturer who provides aftermarket vehicle parts) may not be privy to the configuration profile (e.g., configuration settings) of the vehicle applied by the manufacturer.

Due to the manufacturer's lack of control over the vehicle once it leaves their possession, an end user (e.g., a purchaser of a vehicle) may potentially install aftermarket vehicle parts that are not properly configured for use in the vehicle. This may be further exacerbated in autonomous vehicle deployments in which multiple vehicle parts may be controlled via control circuitry (e.g., hardware) and/or artificial intelligence components, because the control circuitry may fail to recognize the vehicle part and/or may fail to properly configure the vehicle part for use in the vehicle, which may result in failure of the vehicle and, in extreme case, injury or death to the vehicle operator. As used herein, an "autonomous vehicle" is a vehicle such as a car, truck, bus, motorcycle, moped, all-terrain vehicle, military vehicle, tank, etc. in which at least a portion of the decision-making and/or control over vehicle operations is controlled by computer hardware and/or software, as opposed to a human operator.

In some approaches, autonomous vehicles may include one or more artificial intelligence components. These components may be configured to perceive the surrounding environment and take actions to maximize a chance of success of completing a particular goal. In autonomous vehicles, the particular goal may be operating the autonomous vehicle safely. For example, the goal may be to operate the autonomous vehicle at a safe speed, safely control steering of the autonomous vehicle, and/or providing obstacle and/or hazard recognition, and/or obstacle and/or hazard avoidance.

In some approaches, circuitry of the vehicle may be utilized to configure aftermarket vehicle parts and/or update a configuration profile associated with one or more vehicle parts and/or control circuitries. For example, in some approaches, the control circuitry of the vehicle may be configured to transfer information such as configuration and/or configuration profile information between the control circuitry and a vehicle part. However, in some approaches, since the information must be transferred between various components of the vehicle, the data may be susceptible to malicious attacks when en route from the vehicle to a host computing device and/or a vehicle part, or vice versa. As used herein, a "configuration profile" is a set of instructions or semantics that manages the functionality of control circuitry, host computing devices, vehicle parts, etc. In some embodiments, a configuration profile may be firmware, for example.

For example, because operation of the control system in a vehicle may be wholly or partly handled by control circuitry, autonomous vehicles may be susceptible to malicious attacks from third parties. In some approaches, updates to an autonomous vehicle's control circuitry (e.g., firmware updates, object recognition updates, etc.), for example, may be susceptible to man-in-the-middle attacks in which a nefarious actor secretly replays and/or alters communications between the autonomous vehicle and a host computing device responsible for providing updates to the autonomous vehicle and/or a vehicle part to be installed in the vehicle. This may lead to unsafe situations in which a malicious entity may gain control over all or a portion of operation of the autonomous vehicle.

In contrast, embodiments disclosed herein may allow for secure delivery and receipt of critical data between the autonomous vehicle and a vehicle part and/or host computing device. The data may include updates to the firmware of the autonomous vehicle and/or vehicle parts, vehicle part configuration data, trained data sets for operation of the autonomous vehicle's neural network, data collected by the autonomous vehicle such as data corresponding to objects that are unrecognizable to the autonomous vehicle, and the like.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a block diagram of an apparatus 100 in the form of a control unit 102 in accordance with a number of embodiments of the present disclosure. As used herein, a control unit 102, processing resource 104, memory resource 106, controller 108, and/or neural network 110 might also be separately considered an "apparatus."

As shown in FIG. 1, apparatus 100 includes a control unit 102 (e.g., a vehicle electronic control unit), which includes processing resource 104, memory resource 106, and controller 108. The controller 108 further includes a neural network 110. The processing resource may be a central processing unit (CPU), semiconductor based microprocessor, integrated circuit based microprocessor, vector processor, and/or other hardware device(s) suitable for retrieval and execution of instructions stored in the memory resource 106.

The memory resource 106 may include volatile and/or non-volatile memory configured to store instructions executable by the processing resource 104. For example, the memory resource 106 may include flash memory, read-only memory (ROM), programmable read-only memory (PROM), erasable programmable read-only memory (EPROM), electrically erasable programmable read-only memory (EEPROM), dynamic random-access memory (DRAM), static random-access memory (SRAM), and/or other suitable storage media.

The memory resource 106 may store a private key 109 associated with an autonomous vehicle. The private key 109 may be based, at least in part, on a vehicle identification number (VIN) associated with the vehicle. In some embodiments, the private key 109 may be associated with the VIN. In general, each vehicle manufactured has a unique VIN assigned thereto when the vehicle is being manufactured. The VIN may be used to identify a vehicle, among other things.

As discussed above, the private key 109 can be based, at least in part, on the VIN. For example, the private key 109 can be generated such that it is associated with the VIN to facilitate identification of a particular vehicle. Similar to the VIN, the private key may be unique to the vehicle to which it is assigned. In some embodiments, the private key 109 can be stored in the memory resource 106 when the vehicle is manufactured. Embodiments are not so limited; however, and the private key may be stored in a memory device coupled to the control unit 102.

The private key 109 may be read; however, the private key 109 may not be modified. As a result, the integrity of the private key 109 can preserved. In some embodiments, the private key 109 may be used to generate a message authentication code as part of a secure message between an autonomous vehicle and a host computing device, as described in more detail, herein. In some embodiments, the private key 109 may not be transferred from the autonomous vehicle (e.g., the private key 109 may not be transferred across a bus such as vehicle bus 322 illustrated in FIG. 3 providing a signal path from the control unit to other circuitry in the autonomous vehicle).

In some embodiments, the private key 109 may be used to ensure that changes made to the vehicle that are unauthorized are not allowed. For example, the private key 109 may be assigned to replacement vehicle parts to be used in the autonomous vehicle in order to prevent the use of unauthorized vehicle modification such as aftermarket tuning.

The controller 108 can be configured to control operation of the control unit 102. In some embodiments, the controller 108 can decode signals received to the control unit 102 that are used to control operation of the control unit 102. The controller 108 can be a state machine, sequencer, or some other type of controller, and can include hardware and/or firmware (e.g., microcode instructions) in the form of an application specific integrated circuit (ASIC), field programmable gate array, etc. In some embodiments, the controller 108 can control generation and decoding of secure messages transmitted between the control unit 102 and a host computing device (e.g., host computing device 203 illustrated in FIG. 2).

The controller 108 can include neural network 110. The neural network 110 is configured to learn (e.g., progressively improve performance) to do tasks by considering examples. In some embodiments, training data may be provided to the neural network 110 to facilitate learning by the neural network 110. In an autonomous vehicle deployment, as described in more detail herein, the neural network 110 may learn tasks such as how to steer the autonomous vehicle and how fast to operate the autonomous vehicle, as well as tasks such as obstacle and/or hazard recognition, and/or obstacle and/or hazard avoidance.

In some embodiments, the neural network 110 may employ deep learning to utilize data representations to improve its performance of tasks such as how to steer the autonomous vehicle and how fast to operate the autonomous vehicle, as well as tasks such as obstacle and/or hazard recognition, and/or obstacle and/or hazard avoidance. For example, the neural network 109 may be a deep neural network such as a feedforward deep neural network, a recurrent neural network, and/or a convolutional deep neural network.

Figure 2:
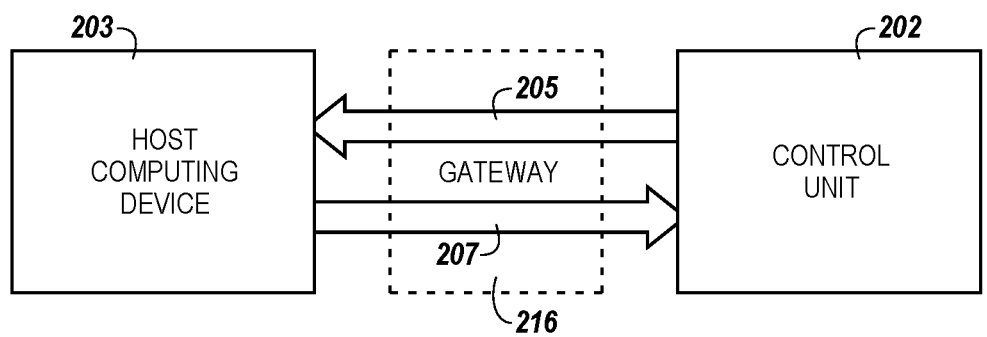
FIG. 2 is a block diagram of a system including a host computing device and a control unit in accordance with a number of embodiments of the present disclosure.

FIG. 2 is a block diagram of a system including a host computing device 203 and a control unit 202 in accordance with a number of embodiments of the present disclosure. As shown in FIG. 2, the control unit 202 and the host computing device 203 may be configured to exchange communications via communication paths 205 and 207. In some embodiments, communication path 205 may be utilized to transfer communications from the control unit 202 to the host computing device 203, and communication path 207 may be utilized to transfer communications from the host computing device 203 to the control unit 202. Communication paths 205 and/or 207 may represent paths over which wireless communications between the control unit 202 and the host computing device 203 may be transferred.

In order to facilitate communication between the control unit 202 and the host computing device 203, various communication protocols may be used. For example, various on board diagnostic protocols (e.g., OBD-II protocols) such as SAE J1850 PWM or SAE J1850 VPM may be used to facilitate communication between the control unit 202 and the host computing device 203. Examples are not so limited; however, and the communication protocol between the control unit 202 and the host computing device 203 may include protocols such as ISO 9141-2, ISO 14230 KPW2000, ISO 15765 CAN, Ethernet, local area network, FlexRay, etc.

In some embodiments, the system may include a gateway 216. As used herein, the gateway 216 may be a network gateway configured to interface between devices that use different protocols. For example, a protocol used by the control unit 202 may be different than a protocol used by the host computing device 203, and the gateway 216 may be configured to facilitate communication between the control unit 202 and the host computing device 203. In some embodiments, the gateway 216 includes hardware configured to convert between the protocols used by the control unit 202 and the host computing device 203.

Figure 6:
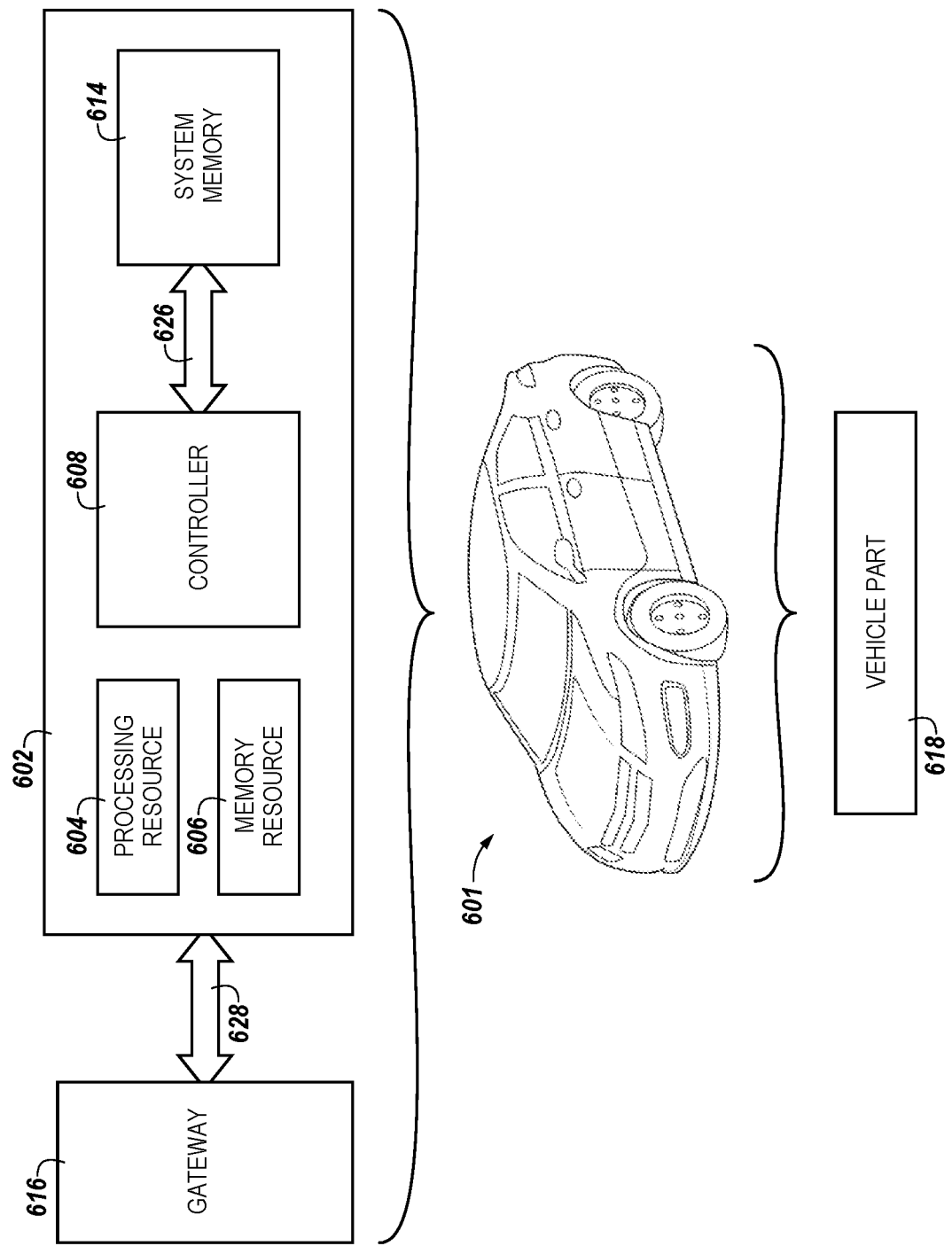
FIG. 6 is a diagram of a system in the form of an autonomous vehicle in accordance with a number of embodiments of the present disclosure.

The gateway 216 may be configured as an internet gateway, cloud gateway, internet of things gateway, server, or other suitable gateway for facilitating communication between the control unit 202 and the host computing device 203. In some embodiments, the gateway may be disposed in the autonomous vehicle as shown in FIG. 6, or the gateway may be disposed in or near the host computing device 203 (e.g., the gateway may be remote to the autonomous vehicle).

The host computing device 203 may include hardware configured to perform particular tasks (e.g., a physical computing device, server, etc.), and/or the host computing device 203 may be deployed as part of a software defined data center (e.g., as a virtualized computing device). In some embodiments, the host computing device 203 may be located in a geophysically different location than the control unit 202, which may be disposed in an autonomous vehicle as described in more detail in connection with FIG. 6, herein. The host computing device 203 may be maintained by the manufacturer of the autonomous vehicle. For example, the host computing device may be under the control of the manufacturer of the vehicle and/or the manufacturer of a vehicle part.

In some embodiments, the host computing device 203 is configured to receive communications from the control unit 202 via communication path 205. The communications may include data collected by the autonomous vehicle, one or more authentication protocols, and/or a secure message, as described in more detail in connection with FIG. 5, herein. In some embodiments, the one or more authentication protocols may include an anti-replay protocol while the message authentication code may comprise a hash-based message authentication code or other suitable message authentication code. As a result, in some embodiments, the communication transmitted from the control unit 202 to the host computing device 203 may be a secure message (e.g., a cryptographic message). The data collected by the autonomous vehicle may correspond to data regarding a vehicle part to be installed in the vehicle, and/or the data may correspond to a request for a configuration profile update, as described herein.

Upon receipt of the communication from the control unit 202, the host computing device 203 may be configured to decrypt the communication received via communication path 205. Once the communication has been decrypted, the host computing device 203 may be configured to generate a secure message including a configuration profile update for the vehicle and/or the vehicle part.

The host computing device 203 may be further configured to transmit the updated set of data based on the analysis back to the control unit 202 via communication path 207. In some embodiments, the host computing device 203 may be configured to transmit the configuration profile update, one or more authentication protocols, and/or a message authentication code with the updated data to the control unit 202, as described in more detail in connection with FIG. 5, herein. The message authentication code may be a HMAC or other suitable message authentication code that is based, at least in part, on the private key (e.g., private key 109 illustrated and discussed in connection with FIG. 1, herein), and in some embodiments, may be the same HMAC that was transmitted from the control unit 202 to the host computing device 203 with the collected data. Embodiments are not so limited; however, and the message authentication code transmitted from the host computing device 203 may be different than the message authentication code transmitted by the control unit 202. The authentication protocol may include an anti-replay protocol which may be different than an anti-replay protocol generated by the control unit 203. As a result, in some embodiments, the communication transmitted from the host computing device 203 to the control unit 202 may be a secure message.

In some embodiments, the control unit 202 is configured to generate a new message authentication code each time the control unit 202 generates a communication to transmit to the host computing device 203. Similarly, in some embodiments, the host computing device 203 is configured to generate a new message authentication code each time the host computing device 203 generates a communication to transmit to the control unit 202.

Figure 3:
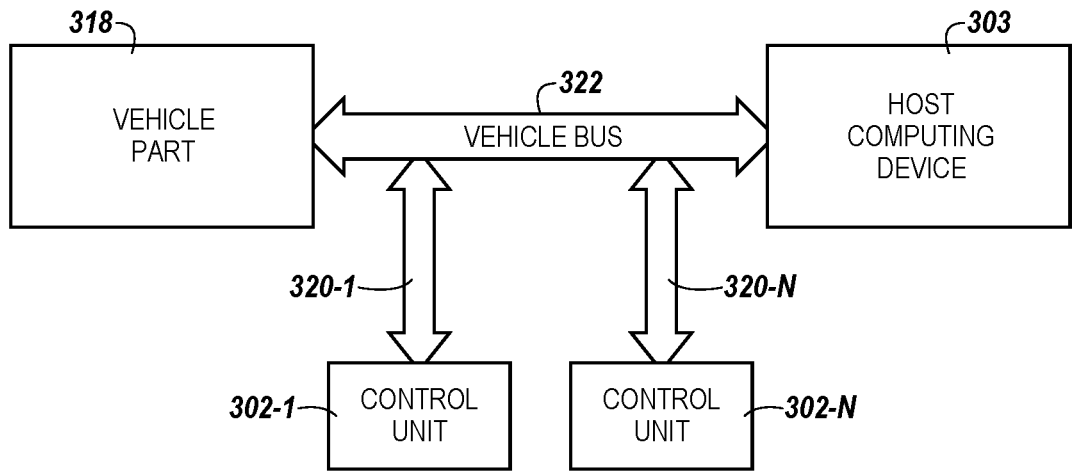
FIG. 3 is a block diagram of a system including a host computing device, control units, and a vehicle part in accordance with a number of embodiments of the present disclosure.

FIG. 3 is a block diagram of a system including a host computing device 303, control units 302-1, . . . , 302-N, and a vehicle part 318 in accordance with a number of embodiments of the present disclosure. The host computing device 303 may be a host computing device associated with an authorized vehicle manufacturer. For example, the host computing device 303 may be under control of an authorized vehicle manufacturer or authorized vehicle part manufacturer. Embodiments are not so limited; however, and in some embodiments, the host computing device 303 may be an on-board computer (e.g., an on-board diagnostic component) utilized by the vehicle. In some embodiments, the on-board computer may be a central unit that controls components of the vehicle. For example, the on-board computer may be a centralized computer disposed in the vehicle and may be configured to receive information corresponding to the status of various components of the vehicle and/or control operation of the various components of the vehicle.

The vehicle part 318 may be a replacement part to a vehicle or an upgrade part for a vehicle. For example, the vehicle part 318 may be an engine component, steering component, braking component, or other component utilized by the vehicle in operation. The vehicle part 318 may include computing resources such as a processing resource, a memory resource, and/or a controller configured to allow the vehicle part 318 to communicate with the host computing device 303 and/or control units 302-1, . . . , 302-N. For example, the vehicle part 318 may include a system on a chip (e.g., an application specific integrated circuit) configured to allow communication between the vehicle part 318 and the host computing device 303 and/or control units 302-1, . . . , 302-N.

In some embodiments, the vehicle part 318 may include a private key. For example, the private key may be stored in a memory resource associated with the vehicle part 318. The private key can be generated such that it is associated with the VIN of the vehicle to facilitate identification of a particular vehicle. Similar to the VIN, the private key may be unique to the vehicle part to which it is assigned. In some embodiments, the private key can be generated when the vehicle is manufactured. In some embodiments, the vehicle part 318 includes hardware and/or instructions to perform various actions and/or tasks, as described in more detail herein.

A vehicle bus 322 may facilitate communication between the host computing device 303 and the vehicle part 318. The vehicle bus 322 may be a vehicle control bus that interconnects components inside a vehicle. The vehicle bus 322 may operate according to various protocols such as controller area network (CAN), local interconnect network (LIN), etc. As shown in FIG. 3, the vehicle bus 322 is further coupled to a plurality of control units 302-1, . . . , 302-N via respective communication paths 320-1, . . . , 320-N.

The plurality of control units 302-1, . . . , 302-N may correspond to various electronic control units utilized by the vehicle. For example, the plurality of control units 302-1, . . . , 302-N may include an engine control component, a vehicle control component, a powertrain control component, an electronic brake control component, a body control components, and/or combinations thereof. These components may be responsible for performing and/or coordinating performance of various vehicle tasks such as operating the vehicle, steering the vehicle, controlling braking of the vehicle, etc.

An engine control component may include hardware and/or instructions configure to control actuators of the engine of the vehicle. For example, the engine control component may control ignition timing, air-to-fuel ratios, etc. of the vehicle. The vehicle control component may include hardware and/or software configured to control engine and/or vehicle performance.

The powertrain control component may include hardware and/or software to control the powertrain of the vehicle. The electronic brake control component may include hardware and/or software to control and/or read data corresponding to the braking system of the vehicle, and the body control component may include hardware and/or software configured to control body features of the vehicle such as power windows, power seats, etc.

Upon installation of the vehicle part 318 in a vehicle, the vehicle part 318 may be power cycled to initiate a communicative connection between the plurality of control units 302-1, . . . , 302-N and/or the host computing device 303. In some embodiments, the vehicle part 318 may include a counter, which may be incremented on power cycling the vehicle part 318. The counter may be monotonic such that it increases by a particular value (e.g., by a non-zero integer) when the vehicle part 318 is power cycled. Embodiments are not so limited; however, and the counter may be monotonically incremented based on receipt of a command from the vehicle manufacturer, in response to generation of the secure message, and/or in response to other events experienced by the vehicle.

In some embodiments, the vehicle part 318 may generate a secure key (e.g., a session key) to facilitate secure transmission of communications between the vehicle part 318 and the host computing device 303 and/or control units 302-1, . . . , 302-N. The secure key may be generated using the private key associated with the vehicle part 318, the value of the counter, a serial number associated with the vehicle part 318 and/or control units 302-1, . . . , 302-N, a VIN corresponding to the vehicle, a typology identifier corresponding to the vehicle part 318 and/or the control units 302-1, . . . , 302-N, or combinations thereof, as described in connection with FIG. 5, herein. In some embodiments, the secure key may be encrypted using a hash-based message authentication code. In some embodiments, the secure key may be transmitted from the vehicle part 318 to the host computing device 303.

The host computing device 303 may also generate a secure key. The secure key associated with the host computing device 303 may also be generated using the private key associated with the vehicle part 318, the value of the counter, a serial number associated with the vehicle part 318 and/or control units 302-1, . . . , 302-N, a VIN corresponding to the vehicle, a typology identifier corresponding to the vehicle part 318 and/or the control units 302-1, . . . , 302-N, or combinations thereof.

Upon receipt of the secure key from the vehicle part 318, the host computing device 303 can determine whether or not the secure key received from the vehicle part 318 corresponds to the secure key generated by the host computing device 303. If the secure keys match, the host computing device 303 can accept communications from the vehicle part 318. However, if the secure key received from the vehicle part 318 does not correspond to the secure key generated by the host computing device 303, the host computing device 303 can reject communications from the vehicle part 318. For example, if the vehicle part 318 is not an authorized vehicle part (e.g., if the vehicle part 318 is an aftermarket part that is not authorized by the vehicle manufacturer), the host computing device 303 can determine that the vehicle part 318 should not be used in the vehicle and can reject communications therefrom.

Figure 4:
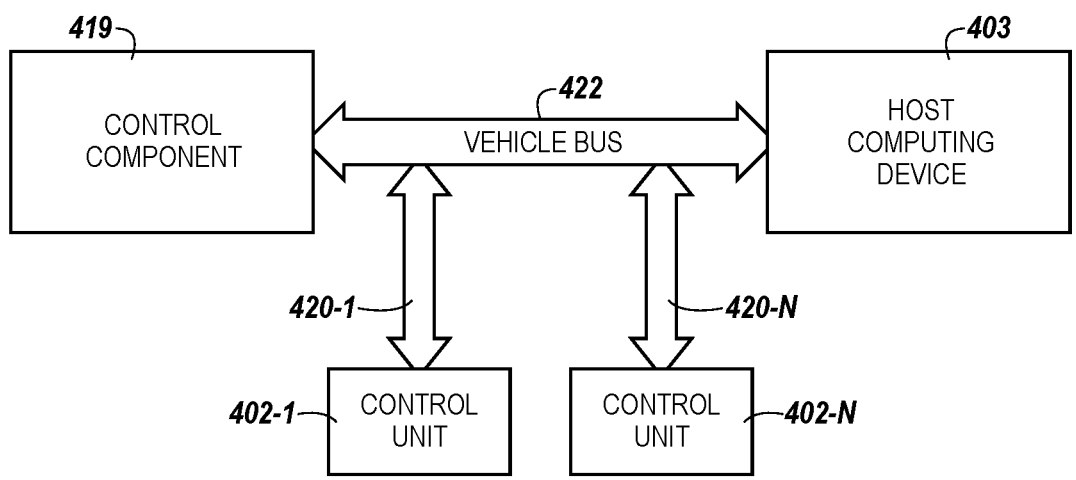
FIG. 4 is a block diagram of a system including a host computing device, control units, and a control component in accordance with a number of embodiments of the present disclosure.

FIG. 4 is a block diagram of a system including a host computing device 403, control units 402-1, . . . , 402-N, and a control component 419 in accordance with a number of embodiments of the present disclosure. The host computing device 403, vehicle bus 422, control units 402-1, . . . , 402-N, and communication paths 420-1, . . . , 420-N may be configured to operate as described in connection with Figure, herein.

As shown in FIG. 4, a vehicle bus 422 may facilitate communication between the host computing device 403 and the control component 419. The control component 419 may be configured to control one or more operations of the vehicle. For example, the control component 419 may be a an engine control component, a vehicle control component, a powertrain control component, an electronic brake control component, a body control components, and/or combinations thereof, as described above in connection with FIG. 3.

In some embodiments, a configuration profile associated with the control component 419 and/or the control units 402-1, . . . , 402-N may be updated. The configuration profile may correspond to firmware or other instructions associated with the control component 419 and/or the control units 402-1, . . . , 402-N.

The host computing device 403 may request and/or receive a communication from the control component 419. The communication may be a secure message as described above in connection with FIG. 3, and below in connections with FIG. 5. The host computing device 403 may determine (as described above in connection with FIG. 3) whether to accept the secure message based on the contents of the secure message. If it is determined that the secure message is to be accepted (e.g., if a secure key received form the control component 419 matches a secure key generated by the host computing device 403), the host computing device 403 may the configuration profile of the control component 419 to be updated.

Figure 5:
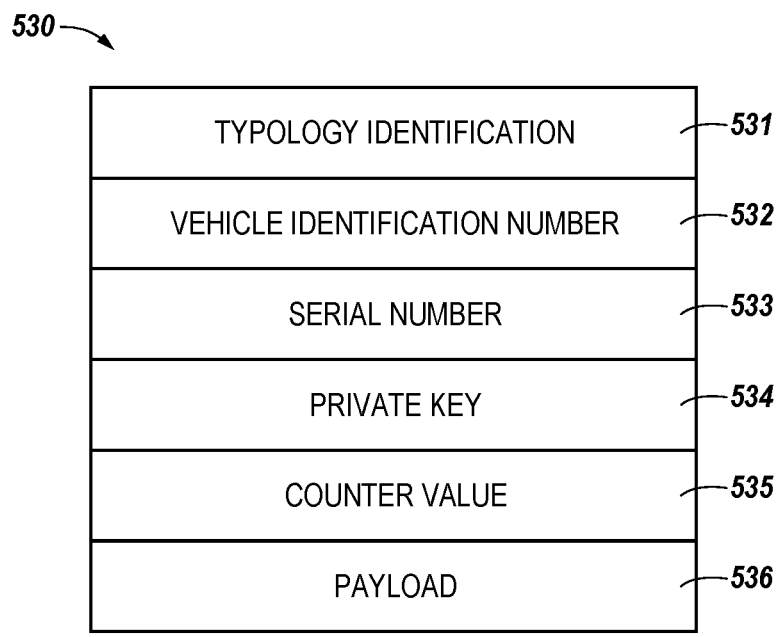
FIG. 5 is a block diagram representing a secure message in accordance with a number of embodiments of the present disclosure.

FIG. 5 is a block diagram representing a secure message 530 in accordance with a number of embodiments of the present disclosure. The secure message 530 shown in FIG. 5 is an example of a secure message 530 that is generated by the vehicle. In some embodiments, the secure message 530 may be transferred between the host computing device (e.g., host computing device 403 illustrated in FIG. 4), the control units (e.g., control units 402-1, . . . , 402-N illustrated in FIG. 4), and/or the vehicle part (e.g., vehicle part 418 illustrated in FIG. 3) and/or a control unit (e.g., control unit 419 illustrated in FIG. 4).

Although not shown explicitly in FIG. 5, the secure message 530 may include a header. The header may include supplemental data placed at the beginning of the secure message 530. The header may include control information to provide for delivering the secure message 530, for example.

The secure message 530 may include a typology identification 531. The typology identification 531 may include classification information associated with a particular control unit, vehicle part, control component, host computing device, etc. For example, the typology identification 531 may include information corresponding to a manufacturer, make, and/or model of the control unit, vehicle part, control component, host computing device, etc.

The secure message 530 may include a vehicle identification number (VIN) 532 associated with the autonomous vehicle. The VIN 532 may be used to identify the particular vehicle from which the secure message 530 originated. In some embodiments, the VIN 532 may be concatenated with (e.g., on top of) the typology identification 531.

The secure message 530 may further include the serial number 533. The serial number may be a serial number of a particular control unit, vehicle part, control component, host computing device, etc. In some embodiments, the serial number 533 may provide specific identification information regarding the particular control unit, vehicle part, control component, host computing device, etc. The serial number 533 may be concatenated with (e.g., on top of) the VIN 532 and/or typology identification 531.

The secure message 530 may further include a private key 534. The private key 534 can be generated such that it is associated with the VIN to facilitate identification of a particular vehicle. Similar to the VIN, the private key 534 may be unique to the vehicle to which it is assigned. The private key 534 may be concatenated with (e.g., on top of) the serial number 533, VIN 532 and/or typology identification 531.

The secure message 530 may further include a counter value 535. The counter value 535 may correspond to a value generated by a counter, as described above. In some embodiments, the counter may be a monotonic counter. The counter may be incremented in response to a power cycle of the vehicle, vehicle part, host computing device, control unit(s), control component(s), or combinations thereof. The counter value 535 may be concatenated with (e.g., on top of) the private key 534, the serial number 533, VIN 532 and/or typology identification 531.

The secure message 530 may further include a payload 536. The payload 536 may include a message to be exchanged between the host computing device, vehicle part, control component, and/or control unit(s). For example, the payload 536 may include a configuration profile update.

In some embodiments, the secure communication 530 may further include an authentication protocol. In some embodiments, the authentication protocol may comprise an anti-replay authentication protocol. The authentication protocol may be provided to alleviate the risk of man-in-the-middle or other malicious packet injection attacks. In some embodiments, the authentication protocol may be uniquely generated each time the control unit (e.g., control unit 302 illustrated in FIG. 3) generates the secure message 530.

In some embodiments, the authentication protocol may include additional fields. For example, the authentication protocol may include a timestamp indicating when the secure message 530 was generated or transmitted. In some embodiments, the authentication protocol may include a random value (e.g., a cryptographic nonce). In some embodiments, the authentication protocol may include a count value that is incremented (e.g., monotonically) as each secure message 530 is generated.

In some embodiments, the authentication protocol may include additional fields. The additional fields may include information to indicate a "freshness" of the message (e.g., to indicate that the message was generated at or within a particular time period) and/or the additional fields may include one or more anti-replay protocols to alleviate the risk of a man-in-the-middle attack, for example. For example, the authentication protocol may include a timestamp indicating when the secure message 530 was generated or transmitted. For example, a secure timestamp may be generated and included as part of the authentication protocol as part of an anti-replay protocol. In some embodiments, the authentication protocol may include a random value (e.g., a cryptographic nonce). The cryptographic nonce may be a random or pseudo-random value that is generated for one time use and included as part of the authentication protocol as part of an anti-replay protocol. In some embodiments, the authentication protocol may include a count value that is incremented (e.g., monotonically) as each secure message 530 is generated. For example, a value associated with the monotonic counter may be included in the authentication protocol as part of an anti-replay protocol. In some embodiments, the authentication protocol may be stored in a memory resource such as memory resource 106 illustrated in FIG. 1, herein. The additional fields may be included as part of the secure message 530.

In some embodiments, the secure message 530 may further include a message authentication code (MAC). The MAC may be generated by the vehicle, vehicle part, control unit(s), control component(s), and/or host computing device, etc. from the vehicle 535 may comprise information to authenticate the secure message 530 and/or to alleviate the risk of a man-in-the-middle attack. In some embodiments, the MAC may be based on the private key, and may comprise a HMAC. The MAC may be generated by the control unit (e.g., control unit 302 illustrated in FIG. 3). In some embodiments, the MAC may be generated based on the private key 543.

Although not explicitly shown in FIG. 5, the secure message 530 may further include a footer. In some embodiments, the footer may include information related to handling the secure message 530, and/or the footer may include information signifying the end of the secure message 530. In some embodiments, the footer may include information concerning the destination of the secure message 530.

FIG. 6 is a diagram of a system in the form of an autonomous vehicle 601 in accordance with a number of embodiments of the present disclosure. As shown in FIG. 3, the autonomous vehicle 601 may include control unit 602, gateway 616, and a vehicle part 618. The gateway 616 may be network gateway as described in connection with FIG. 2, herein. As shown in FIG. 6, the control unit 602 includes a processing resource 604, memory resource 606, and controller 608.

The control unit 602 is configured to communicate with the gateway 616 via communication path 628. Communication path 628 may represent a portion of communication paths 205 and 207 illustrated in FIG. 2. For example, communication path 628 may represent the portion of communication path 205 that is used to transmit communications from the control unit 602 to the host computing device (e.g., host computing device 203 illustrated in FIG. 2) as well as the portion of communication path 207 that is used to receive communications at the control unit 602 from the host computing device.

The controller 608 may be communicatively coupled to system memory 614 via communication path 626. In some embodiments, system memory 614 can include RAM, ROM, SRAM, DRAM, PROM, EPROM, EEPROM, flash memory, or any other suitable computer memory, as well as combinations thereof. The system memory 614 may be used as at least a portion of the memory of control unit 602.

In some embodiments, the vehicle part 618 may be installed in the autonomous vehicle 601. In order to determine if the vehicle part 618 is an authorized vehicle part, secure messages may be exchanged between the control unit 602, the vehicle part 618, and/or a host computing device such as host computing device 303 illustrated in FIG. 3. Although shown as a single control unit 602, the control unit 602 may include one or more control units as described in connection with FIG. 3, herein.

Figure 7:
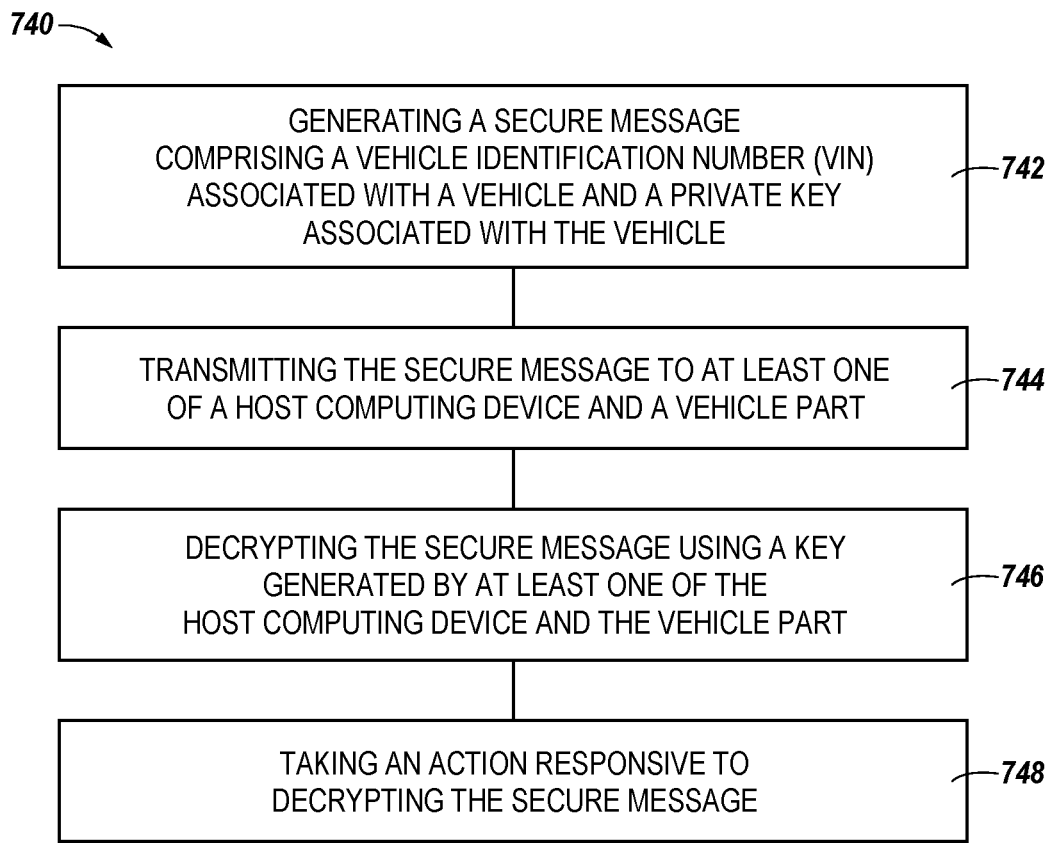
FIG. 7 is a flow diagram in accordance with a number of embodiments of the present disclosure.

FIG. 7 is a flow diagram 740 in accordance with a number of embodiments of the present disclosure. In some embodiments, the flow diagram 740 may represent performance of a method. At block 742, the method may include generating a secure message comprising a vehicle identification number (VIN) associated with a vehicle and a private key associated with the vehicle. In some embodiments, generating the secure message may further include generating the secure message with a serial number corresponding to an electronic control unit (ECU) associated with the vehicle and a typology corresponding to the ECU. The secure message may, in some embodiments, be encrypted using a hash-based message authentication code.

At block 744, the method may include transmitting the secure message to at least one of a host computing device and a vehicle part. In some embodiments, transmitting the secure message to at least one of the host computing device and the vehicle part may include transmitting the secure message without exposing the private key to a bus associated with the vehicle. For example, the private key may be stored such that it is not exposed to vehicle bus (e.g., vehicle bus 322 illustrated in FIG. 3 when the secure message is transmitted.

At block 746, the method may include decrypting the secure message using a key generated by at least one of the host computing device and the vehicle part. The key may be generated as described in more detail in connection with FIG. 1, herein.

At block 748, the method may include taking an action responsive to decrypting the secure message. In some embodiments, taking the action may include updating firmware associated with the vehicle and/or determining that a vehicle part (e.g., an aftermarket or replacement vehicle part to be installed in the vehicle) is authentic.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   incrementing, by an electronic control unit (ECU), a counter associated with the ECU on power up of a vehicle;
   appending a value associated with a counter to a first secure message that includes a private key associated with a replacement vehicle part;
   transmitting, by the ECU the first secure message that includes the private key associated with the replacement vehicle part to a host computing device couplable to the ECU, wherein the host computing device is a host computing device that is associated with an authorized vehicle manufacturer;
   generating, by the host computing device, a secure key;
   comparing, by the host computing device, the secure key to a key associated with the secure message to determine that the key associated with the secure message matches the secure key; and
   transmitting, by the host computing device, a second secure message including a configuration profile update to the ECU;
   receiving, from the replacement vehicle part, a second secure message comprising a vehicle identification number (VIN) or configuration parameter, or both;
   receiving, a second secure message including a configuration profile update to the ECU, wherein the second secure message is generated based, at least in part, on the VIN, the configuration parameter associated with the replacement vehicle part, and on comparison of a generated secure key and a key associated with the first secure message.

2. The method of claim 1, further comprising:
   receiving, by the ECU, the configuration profile update; and
   updating a configuration profile associated with the ECU using the configuration profile update.

3. The method of claim 2, updating firmware associated with the ECU as part of updating the configuration profile associated with the ECU.

4. The method of claim 1, further comprising encrypting, by the ECU, the first secure message using a message authentication code based, at least in part, on the private key or encrypting, by the host computing device, the second secure message using a message authentication code based, at least in part, on the private key, or both.

5. An apparatus, comprising:
   an electronic control unit (ECU) of a vehicle comprising:
      a processing resource; and
      a memory resource coupled to the processing resource, wherein the processing resource is configured to:
      increment a counter associated with the ECU on power up of the vehicle;
      append a value associated with the counter to a first secure message comprising a private key retrieved from the memory resource of the ECU, wherein the private key is associated with a replacement vehicle part;
      transmit a first secure message comprising the private key associated with the replacement vehicle part to circuitry external to the ECU, wherein the circuitry external to the ECU comprises a host computing device that is associated with an authorized vehicle manufacturer of the replacement vehicle part;
      receive, from the replacement vehicle part, a second secure message comprising a vehicle identification number (VIN) or configuration parameter, or both; and
      receive, a second secure message including a configuration profile update to the ECU, wherein the second secure message is generated based, at least in part, on the VIN, the configuration parameter associated with the replacement vehicle part, and on comparison of a generated secure key and a key associated with the first secure message.

6. The apparatus of claim 5, wherein the ECU is configured to:
   receive the configuration profile update; and
   update a configuration profile associated with the ECU using the configuration profile update.

7. The apparatus of claim 5, wherein the ECU is further configured to encrypt the first secure message using a message authentication code based, at least in part, on the private key.

8. The apparatus of claim 5, wherein the ECU is part of an engine control component, a vehicle control component, a powertrain control component, an electronic brake control component, a body control component, or any combination thereof.

9. A system, comprising:
   an electronic control unit (ECU) of a vehicle, wherein the ECU is in communication with a host computing device that is associated with an authorized vehicle manufacturer, and wherein the ECU is configured to:
   increment a counter associated with the ECU on power up of the vehicle;
   append a value associated with the counter to a first secure message including a private key associated with a replacement vehicle part; and
   transmit the first secure message including the private key associated with the replacement vehicle part to the host computing device, wherein the host computing device is configured to:
   generate a secure key;
   compare the secure key to a key associated with the first secure message to determine that the key associated with the first secure message matches the secure key;
   receive, from the replacement vehicle part, a second secure message comprising a vehicle identification number (VIN) or configuration parameter, or both;
   receive, a second secure message including a configuration profile update to the ECU, wherein the second secure message is generated based, at least in part, on the VIN, the configuration parameter associated with the replacement vehicle part, and on comparison of a generated secure key and a key associated with the first secure message; and transmit the second secure message including a configuration profile update to the ECU.

10. The system of claim 9, wherein the ECU is further configured to:

receive the configuration profile update; and update a configuration profile associated with the ECU using the configuration profile update.

11. The system of claim 10, wherein the configuration profile update includes a firmware update for the ECU.

12. The system of claim 9, wherein the host computing device is deployed in a vehicle part installed in the vehicle.

13. The system of claim 9, wherein the ECU is further configured to encrypt the first secure message using a message authentication code based, at least in part, on the private key.

14. The system of claim 9, wherein the first secure message or the second secure message includes a serial number corresponding to the ECU.

15. The system of claim 9, wherein the ECU and the host computing device are located in geographically disparate locations.

16. The system of claim 9, wherein the ECU is part of an engine control component, a vehicle control component, a powertrain control component, an electronic brake control component, a body control component, or any combination thereof.

\* \* \* \* \*